United States Patent [19]

Messinger et al.

[11] Patent Number: 5,542,714
[45] Date of Patent: Aug. 6, 1996

[54] ADAPTER FOR COUPLING A PAIR OF PIPE ELEMENTS

[75] Inventors: Robert Messinger, Avenel; Thomas F. Pinelli, Saddle Brook, both of N.J.

[73] Assignee: H-Tech, Inc., Wilmington, Del.

[21] Appl. No.: 430,431

[22] Filed: Apr. 28, 1995

[51] Int. Cl.$^6$ .................................................... F16L 3/04
[52] U.S. Cl. ........................... 285/158; 285/39; 285/206; 285/328; 285/330; 285/915; 285/921
[58] Field of Search .............................. 285/43, 46, 158, 285/161, 184, 206, 205, 189, 192, 193, 207, 915, 208, 209, 210, 328, 368, 330, 412, 921, 39; 210/500.1

[56] References Cited

U.S. PATENT DOCUMENTS

| | | |
|---|---|---|
| 393,559 | 11/1888 | Loveridge . |
| 406,447 | 7/1889 | Kennedy, Jr. . |
| 429,459 | 6/1890 | Lavigne ............................ 210/500.1 X |
| 572,911 | 12/1896 | Schmidt ..................................... 285/46 |
| 1,138,071 | 5/1915 | Beaufort . |
| 1,138,072 | 5/1915 | Beaufort . |
| 1,212,797 | 1/1917 | Muella et al. ............................. 285/46 |
| 1,214,220 | 1/1917 | Regar .................................. 285/193 X |
| 2,270,296 | 1/1942 | Henning . |
| 2,693,333 | 11/1954 | Race et al. ........................... 285/192 X |
| 3,104,120 | 9/1963 | Myers .................................... 285/161 |
| 3,222,093 | 12/1965 | Simmons . |
| 3,278,201 | 10/1966 | Noland ..................................... 285/46 |
| 3,752,509 | 8/1973 | Stafford . |
| 4,033,613 | 7/1977 | Bram . |
| 4,606,563 | 8/1986 | Berfield et al. . |
| 4,657,673 | 4/1987 | Kessler . |
| 4,679,832 | 7/1987 | Meinig . |
| 4,696,494 | 9/1987 | Schmitz et al. . |

Primary Examiner—Dave W. Arola
Attorney, Agent, or Firm—Selitto & Associates

[57] ABSTRACT

An adapter for coupling a pair of pipe elements through an opening formed in a wall includes a flange mounted thereon. The flange is pivotable relative to the adapter, whereby the flange automatically compensates a non-uniform thickness of the opening.

23 Claims, 7 Drawing Sheets

5,542,714

ADAPTER FOR COUPLING A PAIR OF PIPE ELEMENTS

FIELD OF THE INVENTION

The present invention relates to an adaptor for coupling a pair of pipes, tubes or the like and, more particularly, to an adapter having a flange pivotable relative thereto.

BACKGROUND OF THE INVENTION

Numerous fitting mechanisms have been developed for coupling a pair of pipe members. For instance, U.S. Pat. No. 2,270,296 relates to a pipe coupling unit having a flange radially extending from and permanently secured to an end of a pipe section for attaching the pipe section to an adjacent pipe section, while U.S. Pat. No. 3,752,509 relates to a sealed joint having a metal-to-metal seal for connected tubes.

A unique problem is presented when a pipe element is coupled to another pipe element through an opening formed in a curved wall having a non-uniform thickness resulting from a manufacturing process, such as a blow molding process. Because of the non-uniform thickness of the wall, it is especially difficult to couple the pipe elements in a desired orientation. For instance, FIGS. 1A and 1B show an adapter A fixedly attached to an elbow pipe B, which is mounted within a housing C (only a portion which is shown in FIGS. 1A and 1B) of a filter. The adaptor A is provided with a radial flange E fixedly formed thereon at an end thereof. An opposite end (not show) of the elbow pipe B is fixedly attached to another part of the filter (not shown), such as a diffuser. An opening F, which is formed in a curved wall G of the housing C having a non-uniform thickness, provides an access for coupling the adapter A to an external pipe (not shown) via a bulkhead fitting H. Partly due to the non-uniform wall thickness, the opening F has a non-uniform depth around its periphery. More particularly, the depth of a top portion of the opening F (indicated by double-headed arrow $D_1$ in FIG. 1A) is greater than the depth of a bottom portion of the opening (indicated by double-headed arrow $D_2$ in FIG. 1A). Because the flange E is immovable relative to the elbow pipe B, as the adapter A is assembled with the wall G by threading the bulkhead fitting H to the adapter A through the opening F, an axial thrust created by the threading action between the adapter A and the bulkhead fitting H directly acts on the adapter A and thereby continuously aligns the adapter A and the elbow pipe B. Thus, after the assembly (see FIG. 1B), the adapter A is aligned in an orientation in which both top and bottom portions I, J of the flange E bear against portions K, L, respectively, of the curved wall G. As a result, the longitudinal axis of the adapter A after the assembly (indicated by alternating sequence M of a pair of short lines and a long line in FIG. 1B) is out of alignment with the pre-assembly orientation of the longitudinal axis (indicated by alternating sequence N of a pair of short lines and a long line in FIG. 1B). Such misalignment of the longitudinal axis of the elbow pipe B is undesirable because the connection at which the opposite end of the elbow pipe B is fixedly attached to a part of the filter is subjected to a stress by the force creating the misalignment. In addition, due to this misalignment, a gap O is formed between the bulkhead fitting H and the wall G (see FIG. 1B), and, as a result, the bulkhead fitting H provides an insufficient fluid seal.

While numerous prior art devices for coupling a pair of pipe elements have been developed, they do not specifically address this problem. Accordingly, there is a need for a coupling device addressing this problem.

SUMMARY OF THE INVENTION

The present invention overcomes the disadvantages and shortcomings of the prior art discussed above by providing a new and improved adapter having a flange mounted thereon. More particularly, the flange is pivotable relative to the adapter whereby the flange automatically compensates a non-uniform depth of an opening through which a pair of pipe elements are coupled.

BRIEF DESCRIPTION OF THE DRAWINGS

For a better understanding of the present invention, reference is made to the following description of an exemplary embodiment of the invention considered in conjunction with the accompanying drawings in which.

DETAILED DESCRIPTION OF THE EXEMPLARY EMBODIMENT

Although the present invention can be used in conjunction with any type of pipes, tubes or the like, it is particularly suitable for use in connection with an elbow pipe mounted within a housing of a filter. Accordingly, the present invention will be described hereinafter in connection with such an elbow pipe. It should be understood, however, that the following description is only meant to be illustrative of the present invention and is not meant to limit the scope of the present invention, which has applicability to other types of pipes, tubes or the like.

Figure 2:
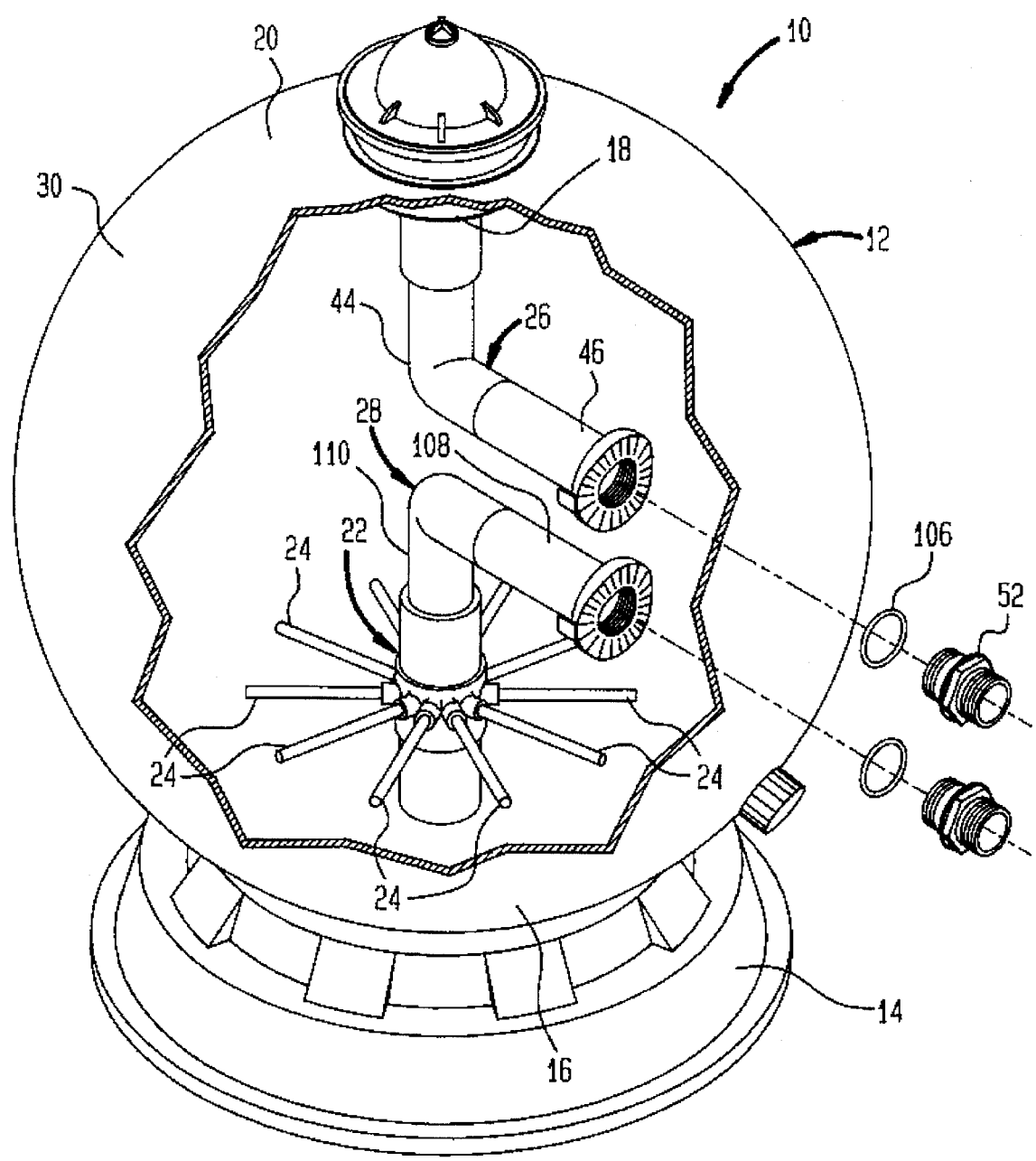
FIG. 2 is a perspective view of a filter which is equipped with a pair of adapters constructed in accordance with the present invention, a portion of a housing of the filter being cut away, showing a portion of the interior of the filter.

With reference to FIG. 2, a filter 10 comprises a substantially spherical housing 12 and a base 14 is attached to a bottom end 16 of the housing 12 for supporting the housing 12 thereon. The housing has a diffuser 18 mounted therewithin at a top end 16 thereof and a lateral holder assembly 22 mounted therewithin at the bottom end 16. The lateral holder assembly 22 includes a plurality of laterals 24 projecting radially therefrom. Sand (not shown) is provided within the housing 12 to function as a filtering medium.

The filter 10 also includes an upper elbow assembly 26 and a lower elbow assembly 28. More particularly, the upper elbow assembly 26, which is mounted within the housing 12, is connected to the housing 12 at one end thereof and to the diffuser 18 at an opposite end thereof. Likewise, the lower elbow assembly 28, which is mounted within the housing 12, is connected to the housing 12 at one end thereof and to the lateral holder assembly at an opposite end thereof.

Figure 1A:
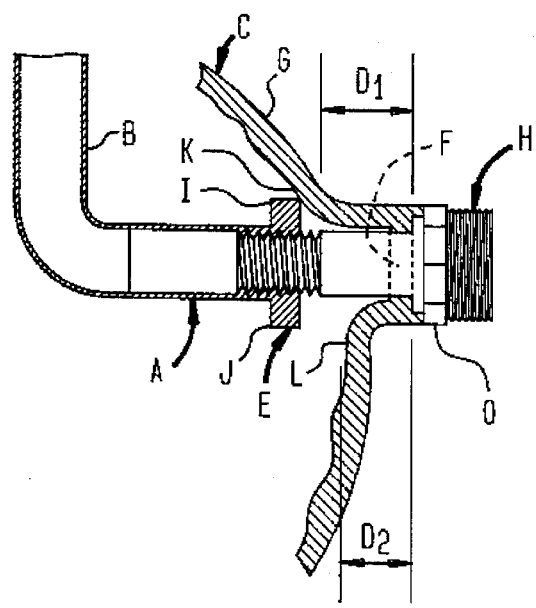
FIG. 1A is a schematic illustration of a conventional pipe adapter for coupling a pair of pipes prior to the assembly thereof.
Figure 1B:
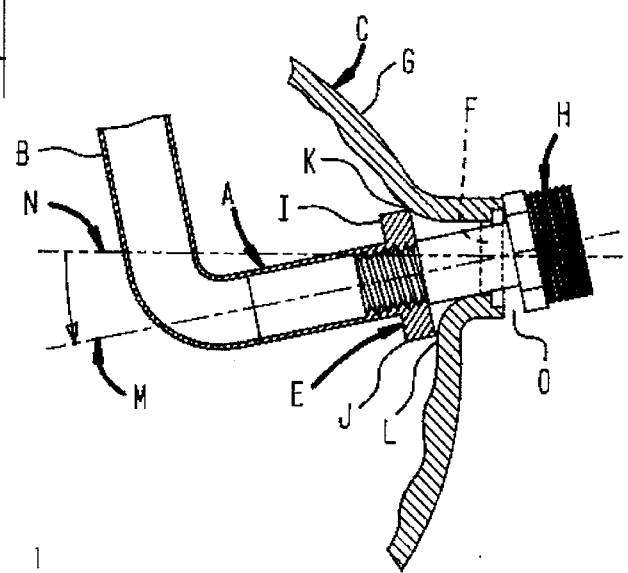
FIG. 1B is a schematic illustration of the adapter shown in FIG. 1A after the assembly thereof.
Figure 4:
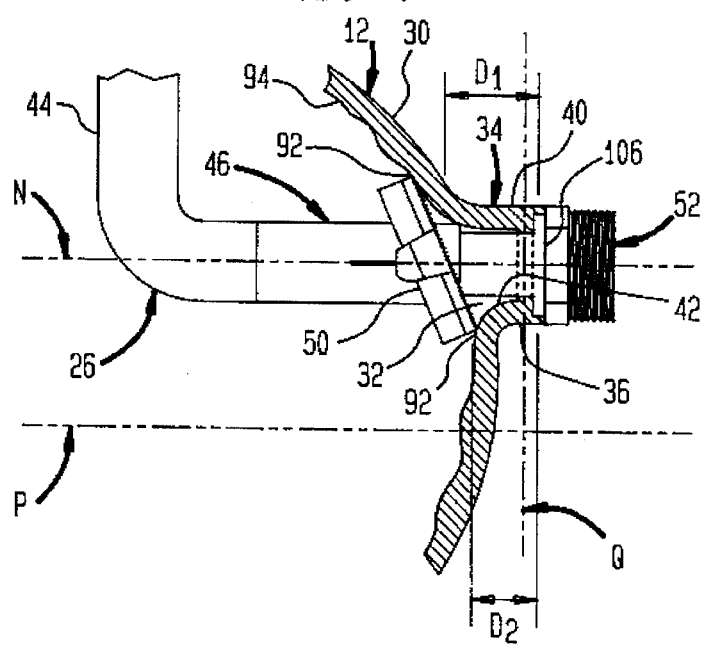
FIG. 4 is a schematic elevational view of the adapter shown in FIG. 3, the adapter being in an assembled orientation.
Figure 3:
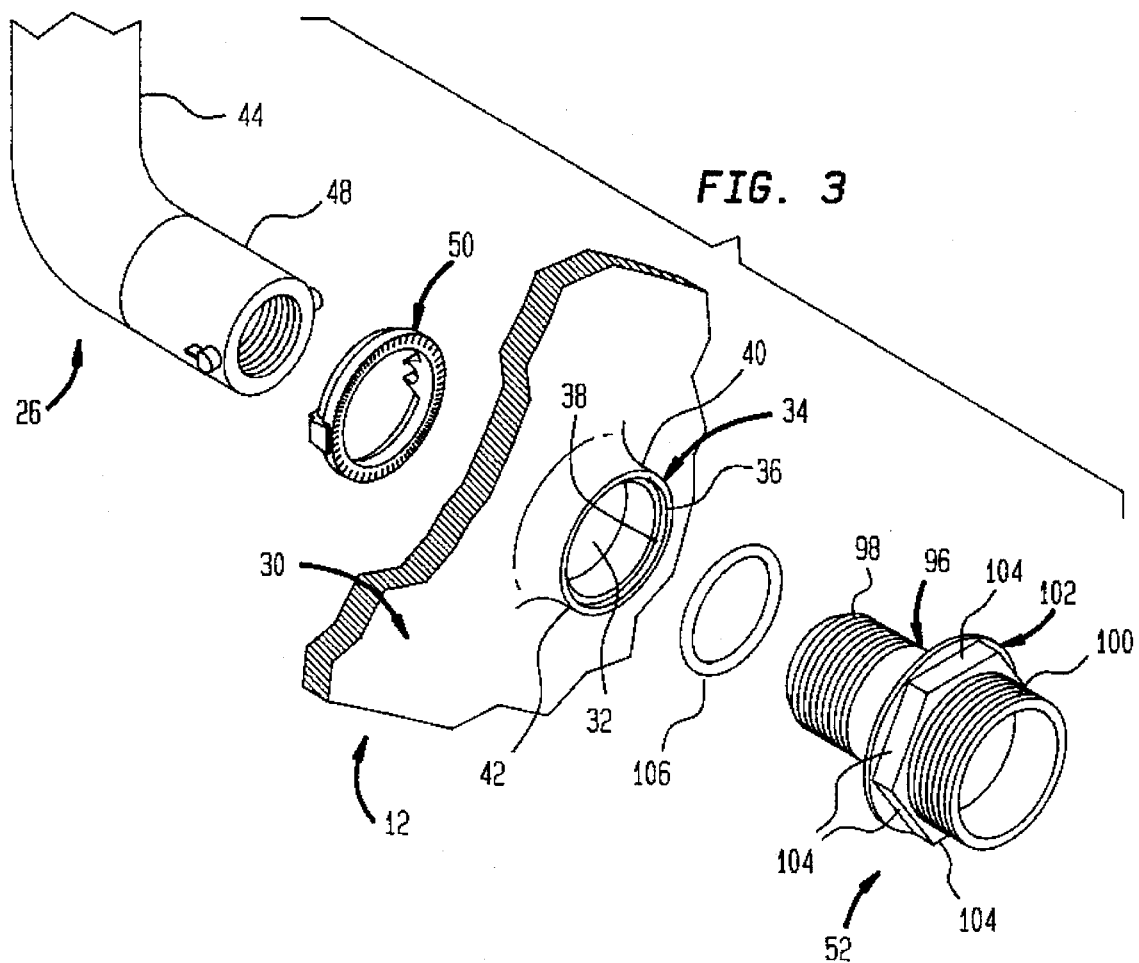
FIG. 3 is an enlarged perspective view of one of the adapters shown in FIG. 2, the adapter being in a disassembled orientation.

The housing 12 is made of polyethylene and produced via a blow molding process and, as a result, the housing 12 is defined by a wall 30 having a non-uniform thickness. Referring to FIGS. 3 and 4, the housing 12 also includes a pair of openings (only one of which is shown in FIGS. 3 and 4) formed in the wall 30 of the housing 12. One opening 32 is positioned in the wall 30 above a central horizontal plane P extending through the center (not shown) of the housing 12 and provides an access for coupling the upper elbow assembly 26 to an external pipe member (not shown). The opening 32 is defined by a port 34 extending horizontally and outwardly from the housing 12 and terminates at an outer end 36 thereof, a diametrical axis Q of which is substantially perpendicular to the central plane P (see FIG. 4). The outer end 36 has a groove 38 communicating with the opening 32 for purposes to be discusses hereinafter. The opening 32 has a non-uniform depth along the periphery thereof resulting partly from the fact that the wall 30 is curved (i.e., spherical) and/or from the fact that the wall 30 has non-uniform thickness. More particularly, an upper portion 40 of the opening 32 having a depth (indicated by double headed arrow $D_1$ in FIG. 4) which is greater than the depth of a lower portion 42 of the opening 32 (indicated by double headed arrow $D_2$ in FIG. 4). The other of the pair of openings (not shown), which provides an access for coupling the lower elbow assembly 28 to an external pipe member (not shown), is constructed in the same manner as the opening 32 except that it is positioned in the wall 30 below the central plane P and that its upper portion has a depth which is smaller than the depth of its lower portion.

Figure 5:
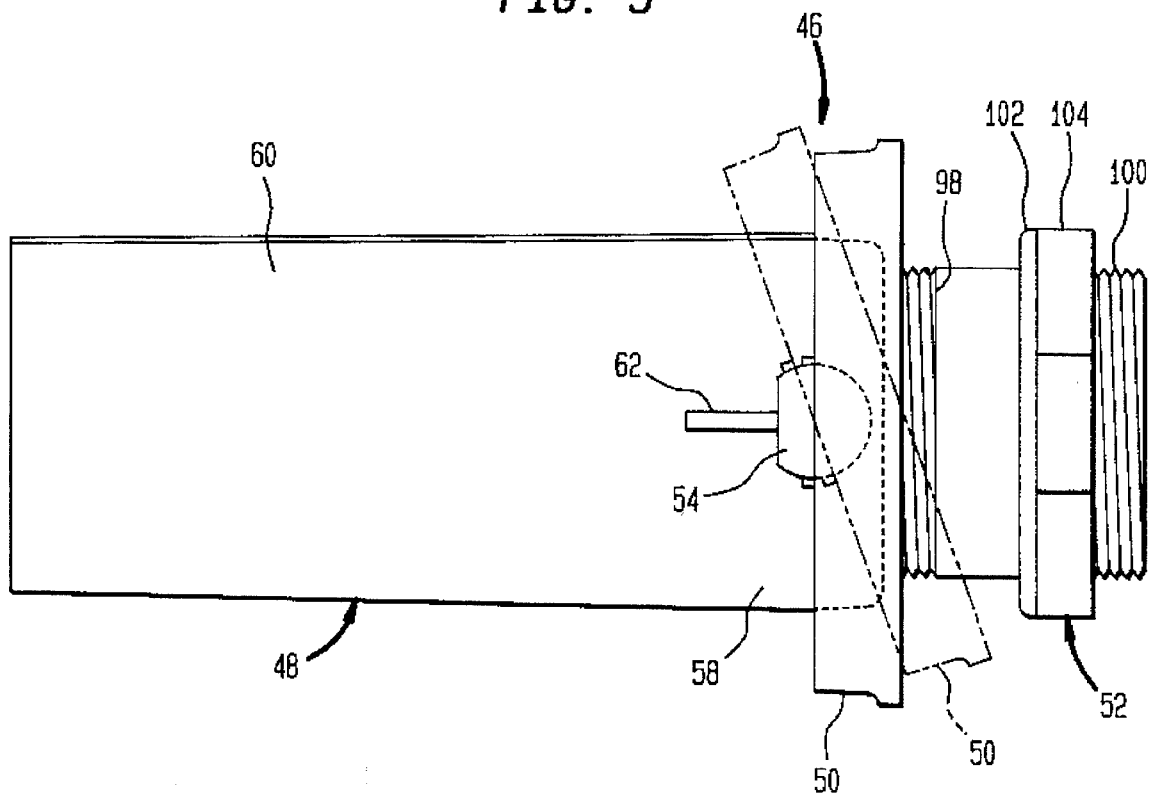
FIG. 5 is an enlarged side elevational view of the adapter shown in FIG. 4, a portion of the housing and a sealing member of the fitting being omitted.
Figure 8:
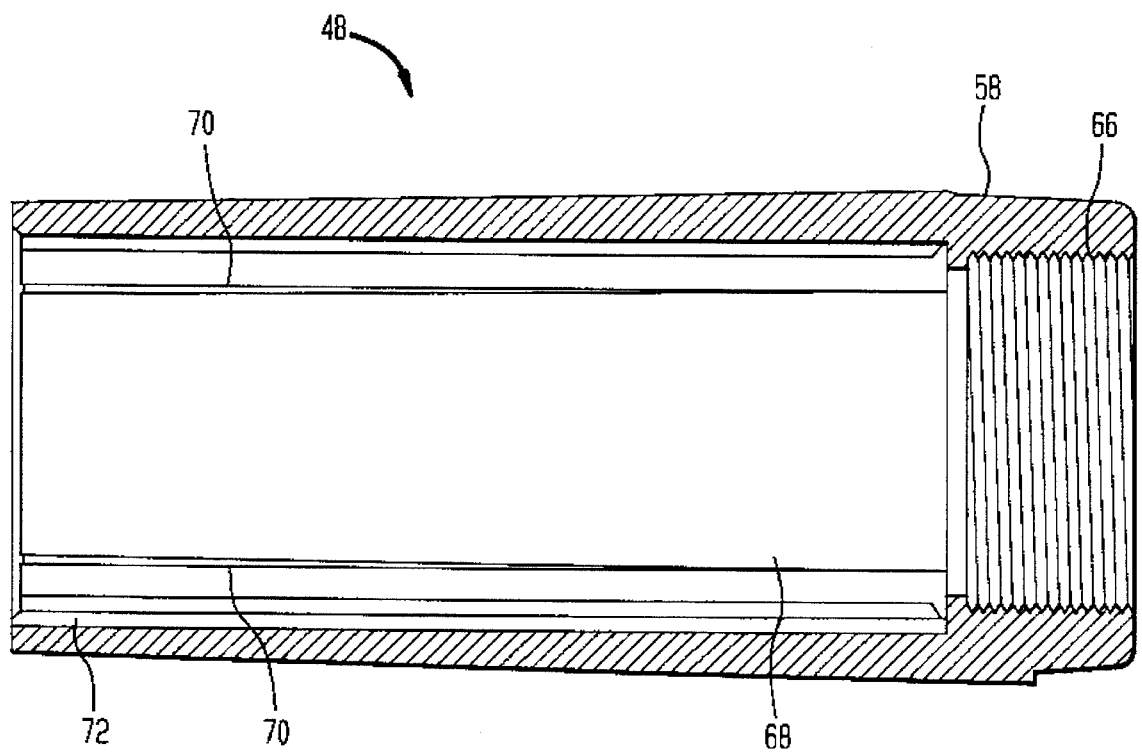
FIG. 8 is a sectional view, taken along section line 8—8 in FIG. 7 and looking in the direction of the arrows, of the pipe member shown in FIG. 7.
Figure 6:
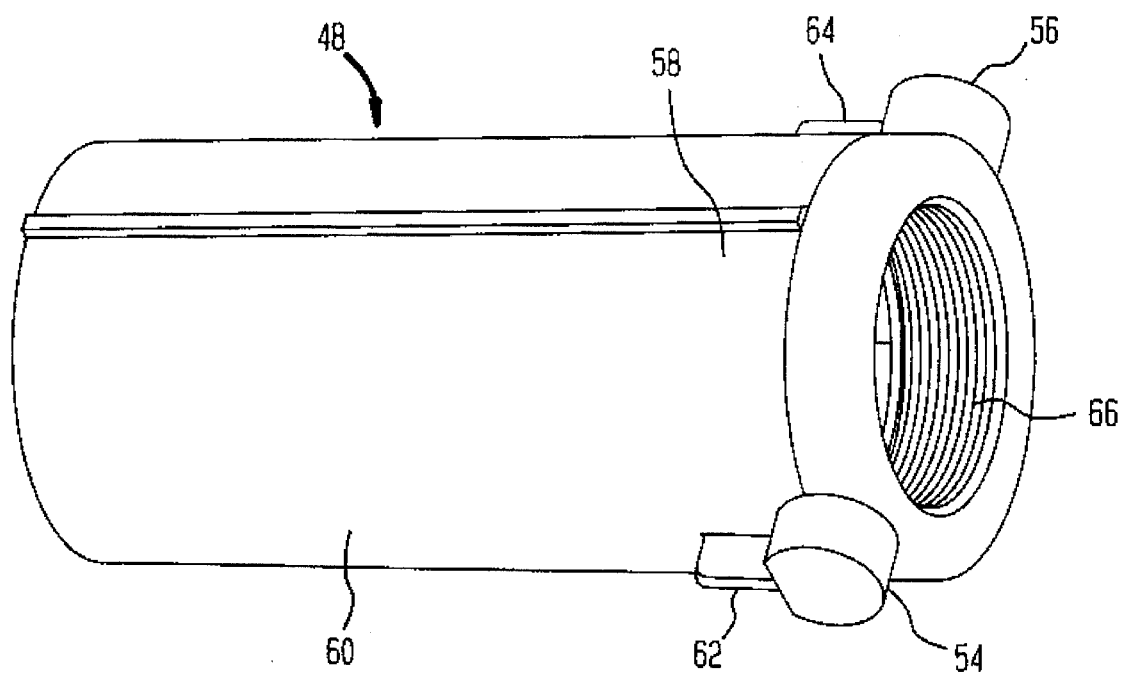
FIG. 6 is an enlarged perspective view of a pipe member of the adapter shown in FIG. 3.
Figure 7:
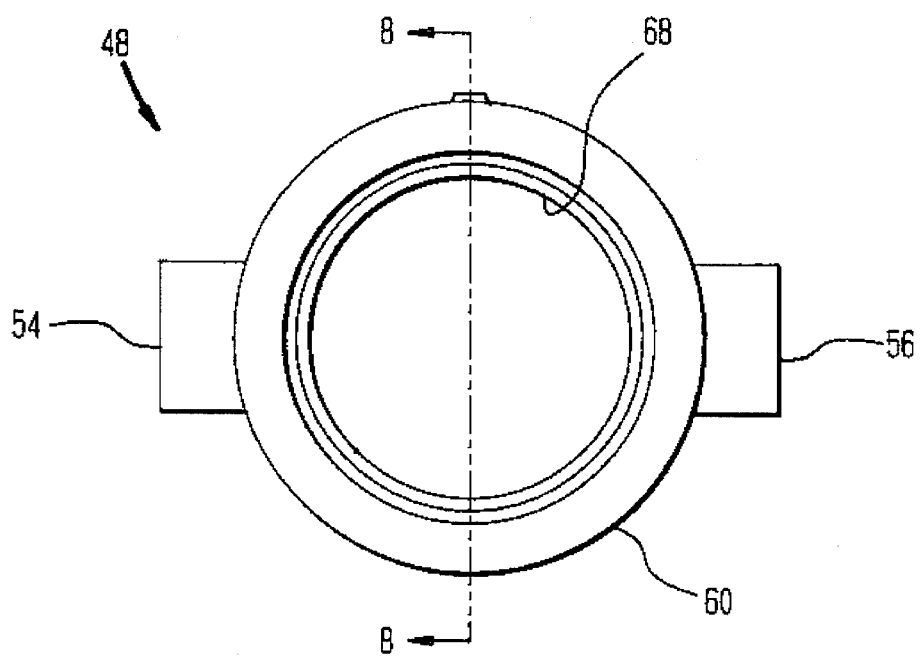
FIG. 7 is a front elevational view of the pipe member shown in FIG. 6.
Figure 9:
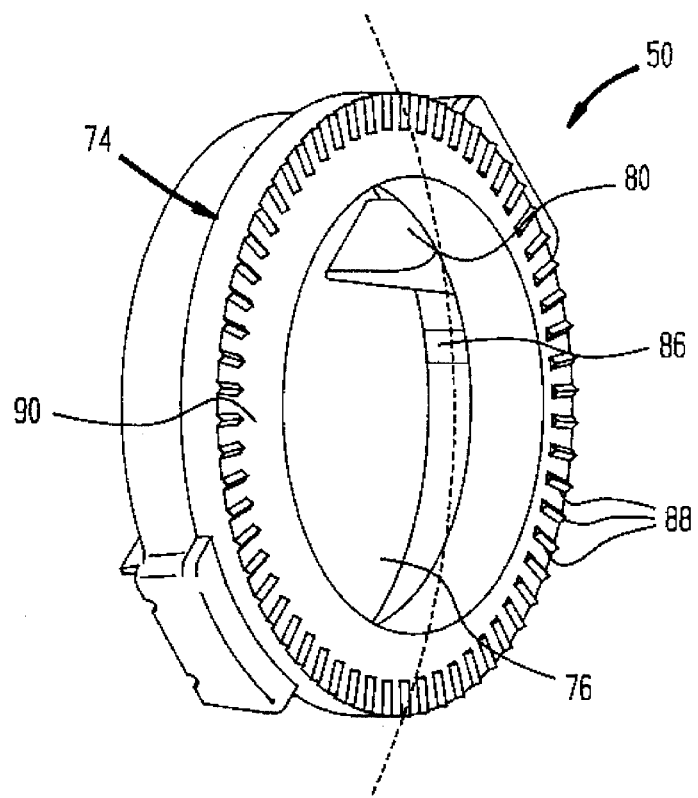
FIG. 9 is an enlarged perspective view of a flange member of the adapter shown in FIG. 3.
Figure 10:
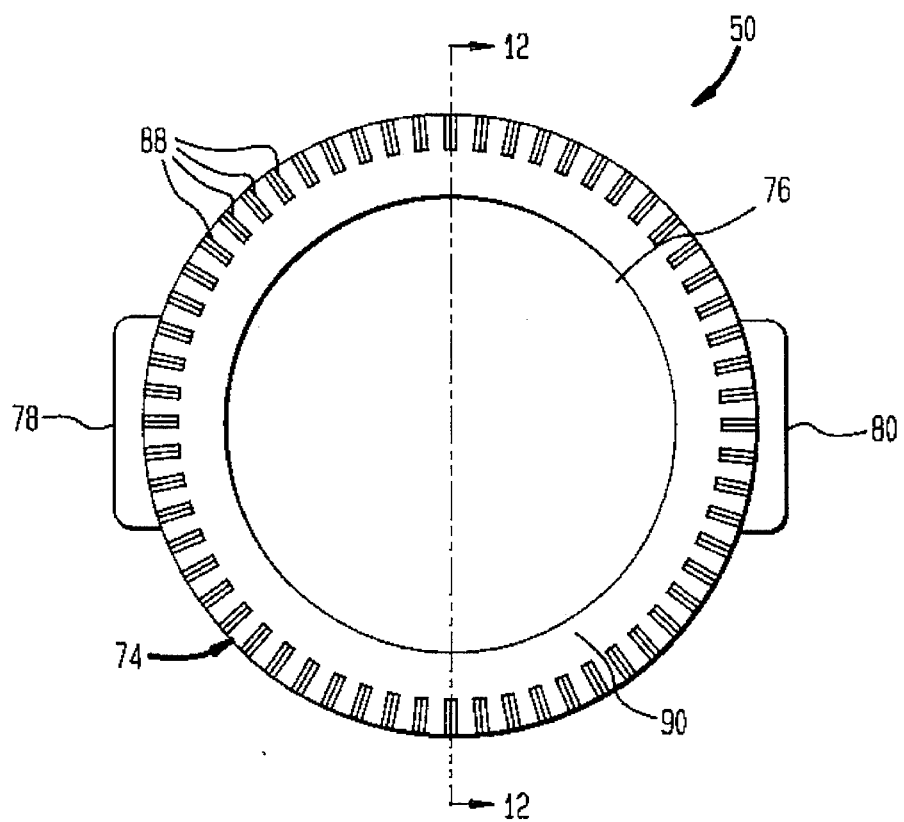
FIG. 10 is a front elevational view of the flange member shown in FIG. 9.
Figure 11:
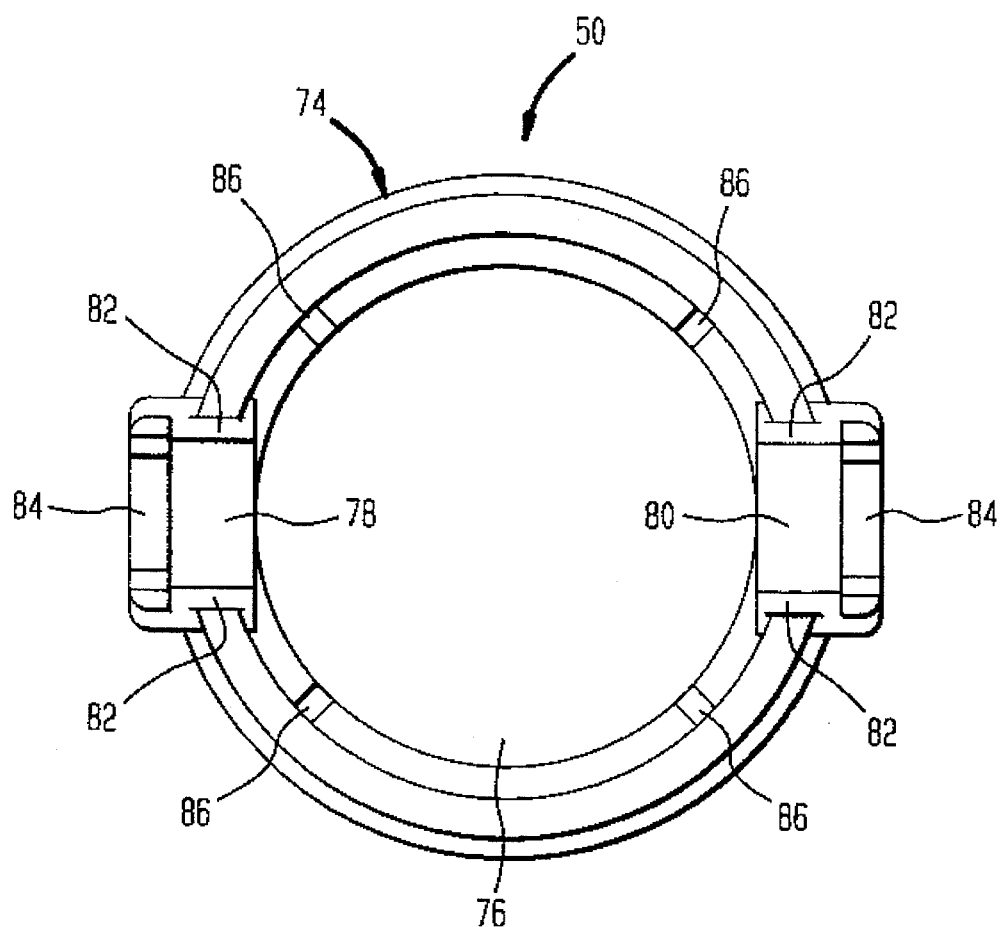
FIG. 11 is a rear elevational view of the flange member shown in FIG. 9.
Figure 12:
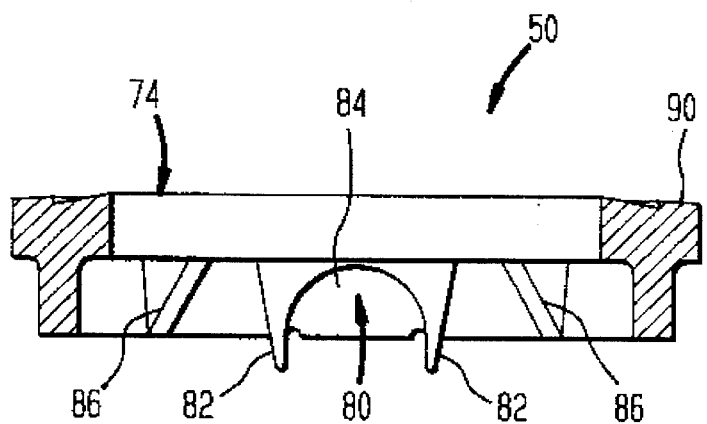
FIG. 12 is a sectional view, taken along section line 12—12 in FIG. 10 and looking in the direction of the arrows, of the flange member shown in FIG. 10.

Referring to FIG. 2, the upper elbow assembly 26 includes an upper elbow pipe 44 and an upper adapter 46 connected to the upper elbow pipe 44 via glue bonding. Referring to FIGS. 3 and 5, the upper adapter 46 includes a pipe member 48, a flange member 50 releasably and pivotably mounted on the pipe member 48 and a bulkhead fitting 52 coupled to the pipe member 48. Referring to FIGS. 5–7, the pipe member 48, includes a pair of substantially cylindrical posts 54, 56 at an end 58 thereof for supporting the flange member 50 thereon. The posts 54, 56 extend outwardly from an outer surface 60 of the pipe member 48 and are fixedly positioned on the outer surface 60 in a substantially opposing fashion. A pair of ribs 62, 64 extends from the posts 54, 56, respectively, away from the end 58 along the outer surface 60 for reinforcing the posts 54, 56, respectively. Referring to FIGS. 6 and 8, the pipe member 48 also includes threads 66 on an inner surface 68 thereof adjacent the end 58 for purposes to be discussed hereinafter. Ribs 70 extend longitudinally along the inner surface 68, being tapered as they approach the end 58, while a groove 72 extends longitudinally along the inner surface 68 for receiving a key (not shown) provided on the upper elbow pipe 44 when the upper elbow pipe 44 is inserted into the pipe member 48 for glue bonding.

Referring generally to FIGS. 9–12, the flange member 50 includes an annular body 74 having a hole 76 therein. The hole 76 is shaped and sized so as to receive the pipe member 48 therein and so as to allow the flange member 50 to pivot relative to the pipe member 48 (see FIG. 5). With specific reference to FIGS. 9 and 11, the flange member 50 also includes a pair of sockets 78, 80, which are positioned on the annular body 74 in a substantially opposing fashion. Each of the sockets 78, 80 is formed by a pair of legs 82 and a retaining wall 86 (see FIG. 12) formed on the annular body 74 and is shaped and sized so as to releasably receive a corresponding one of the pair of posts 54, 56 in a snap-fitting fashion (see FIG. 5). Owing to this snap-fitting engagement of the post/socket joints between the flange member 50 and the pipe member 48, the flange member 50 is pivotable relative to the pipe member 48, one pivoting position of the flange member 50 relative to the pipe member 48 being illustrated by a solid line representation in FIG. 5 and another pivoting position of the flange member 50 relative to the pipe member 48 being illustrated by an alternating sequence representation of a pair of short lines and a long line in FIG. 5. The flange member 50 also includes a plurality of ribs 86 provided along an inner surface of the annular body 74 adjacent the hole 76 for reinforcing the flange member 50. The flange member 50 also includes a plurality of teeth 88 formed along an annular face 90 of the annular body 74. When the upper adapter 46 is being assembled with the filter 10, at least some of the teeth 88 come in contact with a bearing portion 92 of an interior surface 94 of the housing 12 adjacent the opening 32 and grip the bearing portion 92 (see FIG. 4) for a purpose to be discussed hereinafter. In order to maximize the contact area between the teeth 88 and the bearing portion 92 and thereby maximize the gripping effect, the face 90 is contoured to generally correspond to a general contour of the interior surface 94. More particularly and with reference to FIG. 9, the face 90 constitutes an annular portion of a sphere (indicated by dotted lines in FIG. 9) having a diameter substantially equalling to the diameter of the interior surface 94 of the housing 12.

Referring to FIGS. 3 and 5, the bulkhead fitting 52 includes a tubular body 96 having opposite threaded ends 98, 100. The threaded end 98 is shaped and sized such that the it can be threadedly coupled to the threads 66 of the pipe member 48, while the threaded end 100 is shaped and sized such that it can be threadedly coupled to an external pipe member (not shown). The bulkhead fitting 52 also includes a radial flange 102 fixedly and permanently formed on the tubular body 96. The radial flange 102 includes a plurality of pairs of flat opposing surfaces 104, which are substantially parallel to one another, for purposes to be discussed hereinafter. A sealing member 106, such as an O-ring, is provided so that it can be positioned in the groove 38 of the port 34 for providing a seal between the bulkhead fitting 52 and the housing 12 upon the assembly of the upper adapter 46 (see FIG. 4).

With reference to FIG. 2, the lower elbow assembly 28 includes a lower adapter 108 and a lower elbow pipe 110 connected to the lower adapter 108. The lower adapter 108 is constructed and used in the same manner as the upper adapter 46 except that the lower adapter 108 is positioned in an orientation inverted from the orientation of the upper adapter 46. In the foregoing circumstances, the adapter constructed in accordance with the present invention will hereinafter be discussed without differentiating the upper adapter 46 from the lower adapter 108.

The filter 10 can be used by any conventional methods or in any conventional applications. With respect to the use of the adapter 46 in connection with the filter 10, the elbow pipe 44 connected to the pipe member 48 via glue bonding. The flange member 50 is then releasably attached to the end 58 of the pipe member 48 by snap-fitting the posts 54, 56 to the sockets 78, 80, respectively. With the sealing member 106 positioned in the groove 38 of the port 34 and with the elbow pipe 44 connected to the diffuser 18, the threaded end 98 of the bulkhead fitting 52 is inserted through the opening 32 and is threaded with the threads 66 of the pipe member 48. More particularly, using a tool (not shown), such as a spanner, for engaging the flat surfaces 104 of the bulkhead fitting 52, the bulkhead fitting 52 is rotated until the radial flange 102 is in tight engagement with the outer end 36 of the port 34 of the opening 32 via the sealing member 106 and the flange member 50 is in tight engagement with the bearing portion 92 of the housing 12 (see FIG. 4).

It should be appreciated that the adapter 46 constructed in accordance with the present invention provides a simple, convenient and effective mechanism for coupling a pipe positioned on one side of an opening, which is formed in a curved wall and which has a non-uniform depth, to another pipe positioned on an opposite side of the opening 32. For instance, because the flange member 50 is pivotably mounted on the pipe member 48, the flange member 50 automatically adjusts to the contour of the bearing portion 92. In other words, the flange member 50 automatically compensates the non-uniform depth of the opening 32, thereby allowing the longitudinal axis N of the pipe member 48, which is oriented substantially parallel the central plane P prior to the assembly, to remain substantially stationary with respect to the diametrical axis Q of the opening 32 throughout the assembly process of the adapter 46 (see FIG. 4). In this way, a stress upon the connection between the elbow assembly 26 and the diffuser 18 is minimized. In addition, because the flange 102 of the bulkhead fitting 52 remains substantially parallel to the diametrical axis Q after the assembly (see FIG. 4), a sealing effect between the housing 12 and the bulkhead fitting 52 is maximized. It should also be appreciated that because at least some of the teeth 88 grip the bearing portion 92 of the interior surface 94 of the housing 12 during the assembly process, the adapter 46 can be fluidly tightened without the need to access the interior of the housing 12.

It should be noted that the present invention can have many modifications and variations. For instance, the pipe member 48 can be directly coupled to an external pipe member, thereby eliminating the need to provide the bulkhead fitting 52. Moreover, the flange member 50 can be pivotably mounted on the pipe member 48 via mechanisms other than the post/socket joint specifically disclosed herein. The flange member 50 can also be mounted on the pipe member 48 in a non-releasable fashion. In addition, the adapter 52 and the elbow pipe 44 can be connected via a method other than glue bonding or can be integrally formed. The housing 12 of the filter 10 can also be made of materials other than polyethylene and/or be produced via methods other than a blow molding process. In addition, the housing 12 can have a variety of shapes, such as a cylinder.

It should also be noted that the present invention can have a variety of applications. For instance, the adapter 46 can be used in connection with apparatus other than a filter and/or in connection with pipes other than an elbow assembly. Moreover, the adapter 46 of the present invention can be used for compensating a non-uniform opening depth and/or a non-uniform wall thickness which are intended or not intended. For instance, a non-uniform opening depth and/or a non-uniform wall thickness which are intended can result from a design specification, while a non-uniform opening depth and/or a non-uniform wall thickness which are not intended can result from manufacturing limitations inherent in a manufacturing process for producing a housing.

It will be understood that the embodiment described herein is merely exemplary and that a person skilled in the art may make further variations and modifications without departing from the spirit and scope of the invention. All such modifications and variations are intended to be included within the scope of the invention as defined in the appended claims.

We claim:

1. An adapter for coupling a pair of pipe elements to form a conduit passing through an aperture in a curved wall, said aperture having an axis an outer surface, and an annular sealing surface associated with said aperture proximate a first side of said wall and seal means for sealingly engaging said annular sealing surface and conduit, a first of said pair of pipe elements having an annular sealing flange associated therewith, said sealing flange abutting said outer surface and sealing against said sealing means, a second of said pair of pipe elements located on a second, concave side of said wall, the distance between said outer surface and said concave side of said wall varying in the axial direction of said aperture, comprising connecting means for connecting said pair of pipe elements, said connecting means disposed on said concave side of said wall; a support flange, and means for pivotably mounting said support flange on said connecting means for supporting said conduit at an orientation parallel to said aperture axis such that said sealing flange can abut against said outer surface, said support flange pivoting to conform to the interior curvature of said wall and said varying distance between said outer surface and said concave side when said sealing flange is brought into outer engagement with said outer surface, said sealing flange and said support flange clamping said outer surface and said concave side of said wall therebetween in response to tightening said connecting means.

2. The adapter of claim 1, wherein said conduit is oriented symmetrically with respect to said outer surface when said sealing flange is sealingly engaged with said outer surface.

3. The adapter of claim 2, wherein said sealing flange is flat and extends at 90° relative to the axis of said first pipe element.

4. The adapter of claim 2, wherein said connecting means includes a tubular member, said support flange being mounted on said tubular member.

5. The adapter of claim 4, wherein said mounting means has a socket positioned on one of said support flange and said tubular member and a post positioned on one of said support flange and said tubular member, said socket shaped and sized to releasably receive said post for allowing said support flange to pivot relative to said connecting means.

6. The adapter of claim 5, wherein said tubular member includes a pair of said posts positioned on substantially opposing portions thereof and extending outwardly therefrom.

7. The adapter of claim 6, wherein said support flange includes a pair of said sockets positioned on substantially opposing portions thereof, said pair of sockets shaped and sized so as to releasably receive a corresponding one of said pair of posts.

8. The adapter to claim 7, wherein said support flange further includes a hole shaped and sized so as to receive one end of said tubular member and shaped and sized so as to allow a pivotal motion of said flange relative to support tubular member.

9. The adapter of claim 8, wherein said first pipe element is a nipple fitting threadedly coupled to said one end of said tubular member.

10. The adapter of claim 9, wherein said support flange is mounted on said one end of said tubular member.

11. The adapter of claim 10, wherein said connecting means includes an elbow positioned at another end of said tubular member opposite said one end.

12. The adapter of claim 4, wherein said support flange includes an annular body having a hole shaped and sized so as to receive one end of said tubular member and shaped and sized so as to allow a pivotal motion of said support flange relative to said tubular member.

13. The adapter of claim 12, wherein said support flange includes a plurality of teeth provided along said annular body.

14. The adapter of claim 13, wherein said annular body is contoured.

15. The adapter of claim 4, wherein said first of said pair of said pipe elements is a nipple fitting having a threaded end shaped and sized so as to mate with threads provided at one end of said tubular member.

16. The adapter of claim 15, wherein said nipple fitting includes said sealing flange.

17. The adapter of claim 2, wherein said support flange supports said conduit to prevent bending of said second pipe element when said sealing flange is brought into engagement with said outer surface.

18. An adaptor for supporting a conduit passing through an aperture having an axis and a varying axial length in a curved wall in sealing relationship with said aperture, comprising sealing means in said aperture for sealingly engaging said aperture and said conduit and a ring and means for pivotably mounting said ring on said conduit for engaging said wall on a concave side thereof, said ring pivotable on one axis oriented substantially perpendicularly to the direction of aperture axial length variation, said ring compensating for the varying axial length of said aperture such that the ring substantially evenly contacts said curved wall proximate said aperture when said conduit is brought into an orientation parallel to said axis permitting engagement with said wall via a sealing flange means for tightening against said wall opposite said ring, said sealing flange means tightening in a direction parallel with the axis of said conduit where said conduit passes through said wall.

19. The adapter of claim 18, wherein said wall is concave on one side and convex on the other side and said ring is contoured to approximate the shape of said concave side.

20. The adapter of claim 19, wherein said ring has teeth for gripping against said wall when said sealing flange is tightened, the gripping of said teeth in said wall preventing the torsion of said conduit.

21. In combination, a filter including a vessel for containing fluid under pressure, a pipe element mounted within said vessel, said vessel having an opening therein; a generally cylindrical opening extension extending outwardly from said vessel having an interior conduit in communication with said opening and having an axis and a varying axial length; and an adapter for coupling said pipe element to an outlet nipple means installed through said opening and said opening extension and sealing means for sealing said nipple means within said opening, said adapter having a flange and mounting means for pivotably mounting said flange thereon to support said adapter and said nipple means in an orientation parallel to said opening extension axis that permits said nipple means to abut against an outer surface provided on said opening extension distal to said vessel, said adapter having a female threaded aperture, said nipple means having a male threaded pipe extending through said opening and said opening extension and threadedly engaging said female threaded aperture.

22. The combination of claim 21, wherein said nipple means has a sealing flange which provides said abutment extending at approximately 90° relative to the axis of said nipple means.

23. The combination of claim 22, wherein said flange seal means engages a recessed annular sealing surface on the periphery of an end of said opening extension, distal to said vessel.

* * * * *